United States Patent [19]

Thaniyavarn

[11] Patent Number: 4,763,974
[45] Date of Patent: Aug. 16, 1988

[54] Δβ-PHASE REVERSAL COUPLED WAVEGUIDE INTERFEROMETER

[75] Inventor: Suwat Thaniyavarn, Bellevue, Wash.

[73] Assignee: TRW Inc., Redondo Beach, Calif.

[21] Appl. No.: 84,722

[22] Filed: Aug. 13, 1987

[51] Int. Cl.$^4$ .............................................. G01B 9/02
[52] U.S. Cl. ................................ 350/96.14; 350/355; 356/345
[58] Field of Search ............... 350/96.12, 96.13, 96.14, 350/355, 356; 356/345, 350, 351

[56] References Cited

U.S. PATENT DOCUMENTS 4,291,939 9/1981 Gallorenzi et al. .............. 350/96.14
4,553,810 11/1985 Alferness et al. ................ 350/96.14

OTHER PUBLICATIONS

Burns et al., "Interferometric Waveguide Modulator with Polarization-Independent Operation", *Applied Physics Letters*, vol. 33, No. 11, Dec. 1978, pp. 944–947.
Bulmer et al., "Linear Interferometric Waveguide Modulator for Electromagnetic-Field Detection", *Optics Letters*, vol. 5, No. 5, May 1980, pp. 176–178.
Bulmer et al. II, "Linear Interferometric Modulators in Ti:LiNbO$_3$", *Journal of Lightwave Technology*, vol. LT-2, No. 4, Aug. 1984, pp. 512–521.

*Primary Examiner*—John D. Lee
*Attorney, Agent, or Firm*—James M. Steinberger; Thomas N. Giaccherini

[57] ABSTRACT

An improved electro-optic coupled waveguide interferometer (50) is provided. The device comprises a single input (52), a Y-junction splitter (54), two interferometric arms (56a, 56b), a Y-junction combiner (58), a single output (60) and multiple equal-length sections of electrodes (62a-d) with alternating applied voltage polarities. The device of the invention permits use of much smaller Y-junction branching angle, which reduces scattering losses, or a shorter branching waveguide section, which allows construction of a device having an overall shorter length than prior art interferometers. The device takes advantage of a close placement of the interferometer arms, which results in a transfer of optical energy and facilitates a single-gap electrode structure for efficient push-pull operation. The use of multiple-section electrodes restores the high modulation depth otherwise destroyed by the close placement of the interferometric arms.

19 Claims, 3 Drawing Sheets

Δβ-PHASE REVERSAL COUPLED WAVEGUIDE INTERFEROMETER

TECHNICAL FIELD

This invention relates to integrated optic devices, and, more particularly, to coupled waveguide interferometers.

BACKGROUND ART

An electro-optic Mach-Zehnder waveguide interferometer is by far the most utilized integrated optical intensity modulator in a high speed optical communication system. In addition, the device can be used in other applications, such as analog-to-digital converters, sensors, frequency modulators, and the like.

In the conventional Mach-Zehnder waveguide interferometer, the device consists of an input waveguide, a Y-junction splitter, two interferometric arms, a Y-junction combiner, and an output waveguide. The waveguides are all single mode.

The input optical wave is split equally by the input Y-junction into the two interferometric arms. The two components recombine constructively, producing the first-order mode at the output Y-junction if they are in phase. This output light is guided and confined by the single mode output waveguide. If a relative phase shift is introduced between the two components so that they are no longer in phase, the two waves will interfere at the output Y-junction, producing a second-order mode which will not be supported by the single-mode output waveguide, but rather will radiate out into the substrate. This amplitude modulation can be accomplished by electro-optically modulating the relative phases of the two waves.

Typically, the two interferometric waveguide arms need to be sufficiently separated so that there is no optical power coupling between the two waveguides. For a Mach-Zehnder waveguide interferometer formed in a titanium-diffused LiNbO$_3$ substrate, distances between the two arms of about 20 to 40 μm are commonly used. As a result, a three-electrode structure, comprising three parallel electrodes ("two-gap" electrode structure) is often employed to achieve a push-pull type of operation in order to reduce the voltage drive. However, the penalty for this is an approximate doubling of the capacitance and consequent reduction of the maximum achievable electrical bandwidth of the device. Furthermore, due to the large separation between the two interferometric arms, either the Y-junction branching angle has to be comparatively large or the branching waveguide section has to be comparatively long.

However, if the separation between the two interferometric arms is reduced so that an electrode structure with one single gap can be used, the interferometer may no longer perform as an ideal Mach-Zehnder interferometer. When the waveguides are in close proximity, there is also a transfer of optical energy between the two waveguides via evanescent field coupling.

Because of the coupling between the two waveguides, applying an electric field via the electrode not only electro-optically introduces a simple relative phase shift, but also affects the optical power transfer between the two coupled waveguides. As a result of this additional power interchange along the two waveguides, a uniform one-section electrode structure can no longer accomplish an induced 180° phase difference between the two wave components at the output Y-junction which is required for high depth of modulation.

DISCLOSURE OF INVENTION

In accordance with the invention, a new coupled waveguide interferometer is provided with an electrode structure comprising multiple sections of alternating voltage polarities. The electrode structure makes it possible to achieve high modulation depth, while retaining the advantages of the Mach-Zehnder interferometer.

The new device has a structure similar to that of a Mach-Zehnder interferometer, except that the two waveguide arms are separated by much smaller spacing in such a way that there is optical coupling between them. In the simplest embodiment, the electrode structure associated with each waveguide comprises two equal-length sections to which voltages of equal but opposite polarities can be applied. The device of the invention exhibits a substantial improvement in the modulation depth over that of prior art devices.

The advantage of the structure of the invention is that the separation between the two arms can be much smaller than the conventional device and thus facilitates a single-gap electrode structure for push-pull operation. This results in a smaller electrode capacitance, which means an increase in the maximum achievable electrical bandwidth as compared to that of a conventional double-gap structure. Furthermore, the value of either the branching angle or the branching waveguide section length may be considerably reduced over the corresponding value of the Mach-Zehnder interferometer, which yields a reduced loss associated with the branching waveguide and a reduction in the overall device length.

BEST MODES FOR CARRYING OUT THE INVENTION

Figure 1A:
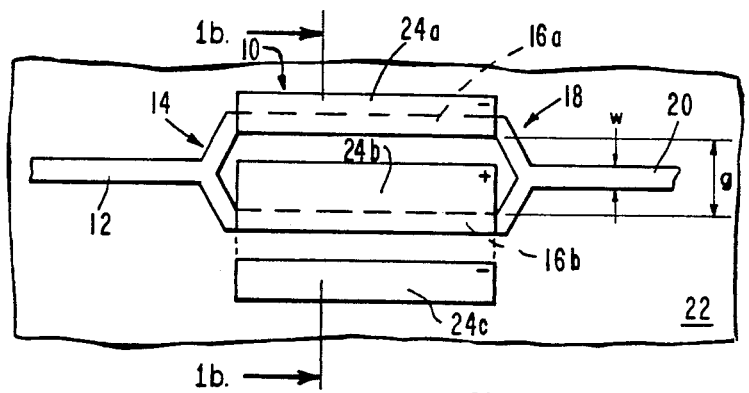
FIG. 1a is a schematic top plan view of a conventional waveguide Mach-Zehnder interferometer, having a dual-gap electrode structure.
Figure 2A:
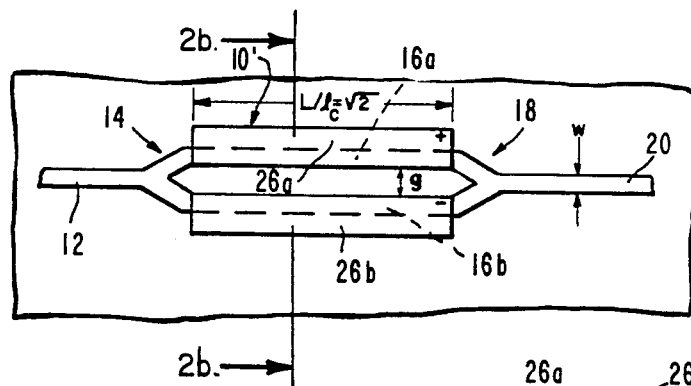
FIG. 2a is a schematic top plan view of a conventional Mach-Zehnder interferometer with coupled waveguide arms, having a single-gap electrode structure.

Referring now to the drawings, wherein like numerals of reference designated like elements throughout, FIGS. 1a and 2a depict conventional devices. The associated theoretical plot of output intensity as a function of normalized voltage $\Delta\beta L/\pi$, where $\Delta\beta$ is the propagation constant change due to the electro-optic effect and L is the interaction length of the device, is shown in FIG. 2c for the device of FIG. 2a. The corresponding plot for the device depicted in FIG. 1a is well-known and is described below.

In particular, FIG. 1a shows a schematic diagram of a conventional waveguide Mach-Zehnder interferometer 10, consisting of an input waveguide 12, a Y-junction splitter 14, two interferometric arms 16a, 16b, a Y-junction combiner 18 and an output waveguide 20, formed on a substrate 22. The waveguides are all single mode.

The input optical wave is split equally by the input Y-junction 14 into the two interferometric arms 16a, 16b. The two components recombine constructively, producing the first-order mode at the output Y-junction 18 if they are in phase. This output light is guided and confined by the single mode output waveguide 20. If a relative phase shift is introduced between the two components 16a, 16b so that they are no longer in phase, the two waves will interfere at the output Y-junction 18, producing a second-order mode which will not be supported by the single-mode output waveguide 20, but rather will radiate out into the substrate 22 supporting the device 10. Thus, amplitude modulation can be accomplished by electro-optically modulating the relative phases of the two waves, that is, by applying an electric field to electrodes 24.

In the conventional Mach-Zehnder interferometer, two electrodes, one similar to 24a and the other similar to a combination of 24b and 24c, as shown by the connecting dotted lines, are used.

Figure 1B:
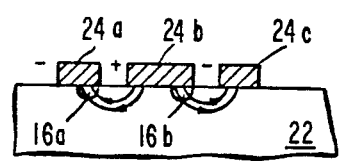
FIG. 1b is a cross-sectional view taken along the line 1—1 of FIG. 1a, showing the electric field lines between adjacent waveguides.

Typically, the two interferometric waveguide arms 16a, 16b need to be sufficiently separated so that there is no optical power coupling between the two waveguides 16a, 16b. For a $LiNbO_3$ waveguide Mach-Zehnder interferometer, a distance or gap g between the two arms 16a, 16b of about 20 to 40 $\mu$m is commonly used. As a result, a dual-gap structure, comprising electrodes 24a, 24b, 24c, is often employed to achieve a push-pull type of operation. Optical power coupling between the three electrodes is depicted in FIG. 1b for closely spaced waveguide arms 16a, 16b. A plot of the output intensity as a function of applied voltage for the device of FIG. 1a evidences a sinusoidal-type response, as is well-known, which provides a high modulation depth required for efficient modulation.

One of the disadvantages of the device depicted in FIG. 1a is that the capacitance of this electrode configuration is approximateLy twice that of a single-gap electrode. Furthermore, due to the large separation between the two interferometric arms 16a, 16b, the Y-junction branching angle is comparatively large (typically chosen to be about 1°) or the branching waveguide section is comparatively long (depending on the angle chosen; for a branching angle of 1°, the length of the branching waveguide sectIon is on the order of 1 mm, with a separation or gap g between waveguides of about 20 $\mu$m).

However, if the separation between the two interferometric arms is reduced so that an electrode structure with one single gap can be used, such as shown in FIG. 2a, the device may no longer perform as an ideal Mach-Zehnder interferometer. The single gap structure 10' is depicted in FIG. 2a, comprising a pair of electrodes 26a, 26b.

Figure 2B:
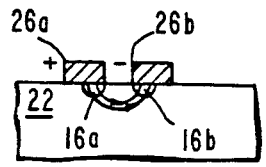
FIG. 2b is a cross-sectional view taken along the line 2—2 of FIG. 2a, showing the electric field lines between adjacent waveguides.
Figure 2C:
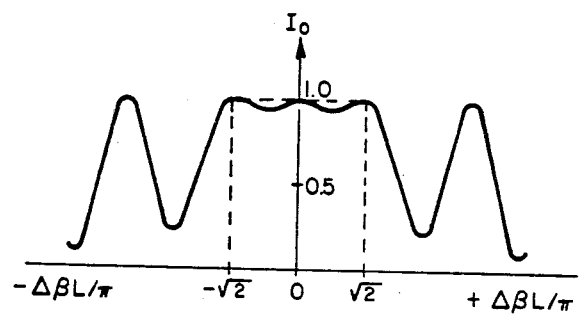
FIG. 2c is a theoretical plot of output intensity as a function of applied voltage for the device of FIG. 2a when the length L=√2 l$_c$.

When the waveguides 16a, 16b are in close proximity, for example, less than about 10 $\mu$m, there is also an additional effect due to the transfer of optical energy between the two waveguides 16a, 16b via evanescent field coupling, as shown in FIG. 2b.

FIG. 2c illustrates the calculated output intensity as a function of applied voltage (normalized) for a device 10' in which the separation or gap g between the waveguides 16a, 16b is 4 $\mu$m. The device does not exhibit an ordinary interferometer characteristic with sinusoidal-type response at small applied voltages. Rather, the modulation depth is seen to be extremely poor. Consequently, the device of FIG. 2a is a poor optical modulator. Because of the coupling between the two waveguides 16a, 16b, applying an electric field via the electrodes 26a, 26b not only electro-optically introduces a simple relative phase shift, but also affects the optical power transfer characteristics between the two coupled waveguides 16a, 16b.

Figure 3A:
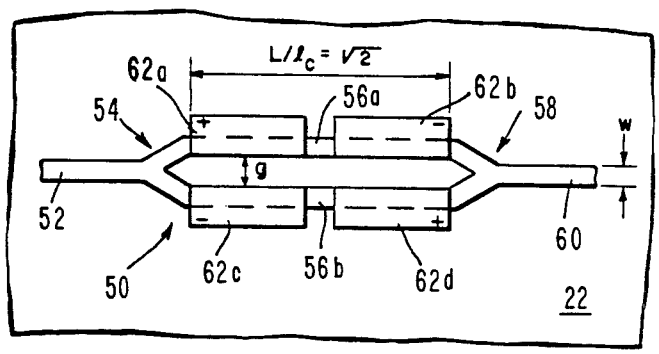
FIG. 3a is a schematic top plan view of a Δβ-phase reversal coupled waveguide interferometer in accordance with the invention.
Figure 3B:
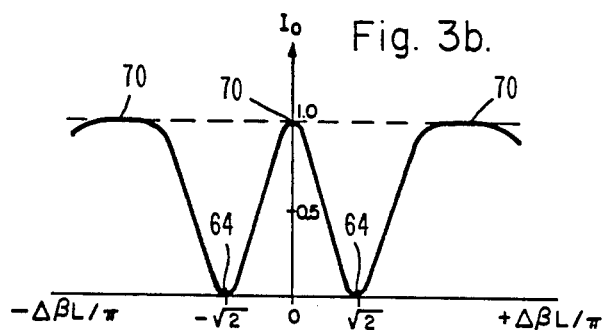
FIG. 3b is a theoretical plot of output intensity as a function of applied voltage for the device of FIG. 4a when the length L=√2 l$_c$.

In accordance with the invention, a new coupled waveguide interferometer 50 using multiple sections of alternating voltage polarities is provided, depicted in FIG. 3a. The device 50 comprises a single input 52, a Y-junction splitter 54, two interferometric arms 56a, 56b, a Y-junction combiner 58 and an output waveguide 60. The input 52, junction splitter 54, interferometric arms 56a, 56b, junction combiner 58 and output waveguide 60 are identical to their corresponding elements 12 through 20 depicted in FIGS. 1a and 2a. Multiple, split electrodes 62a–d are provided, which permit application of alternating polarity, resulting in high modulation depth, as shown in the plot of calculated output intensity as a function of applied voltage (normalized), depicted in FIG. 3b.

For the simplest case, a two-section electrode, as illustrated in FIG. 3a, may be used, comprising two split electrodes for each interferometric arm 56a, 56b. When the coupling between the two waveguides 56a, 56b increases, a multiple (three-, four-, etc.) section electrode may be used to improve the modulation depth of the devices.

The device 50 requires a much smaller Y-junction branching angle or a shorter branching waveguide section than the devices 10 and 10' depicted in FIGS. 1a and 2a, respectively. For example, the gap g between waveguides 56a, 56b may be a 4 $\mu$m, with a branching angle of 1° and a branching waveguide section of less than 250 $\mu$m in length. Thus, for the same branching angle, the length of the branching waveguide section of the device of the invention is more than four-fold shorter than prior art devices. Thus, the overall device length is shorter than that of the prior art devices.

On the other hand, for the same gap, with a branching waveguide section length of 500 $\mu$m for both prior art devices and the device of the invention, a branching angle of 2.3° is required for the prior art device, while a branching angle of only 0.46°, or one-fifth of the prior device, is required for the device of the invention.

As is well-known, a branching angle of greater than 1° provides excessive loss, due to scattering, at the Y-junction. If the angle is small, the branching section of the prior art devices will normally consist of many step-taper short sections, which also increases losses.

Thus, as a consequence of a reduced angle, the device of the invention evidences a reduction in scattering loss, compared to prior art devices.

The separation or gap g between the two interferometer waveguide arms is 3 to 6 times smaller than the device of FIG. 1a, so that a single-gap electrode structure, as depicted in FIG. 3a, can be used for more efficient push-pull operation, compared to that of a double-gap electrode structure such as illustrated in FIG. 1a. The single-gap electrode configuration of the invention also results in a reduction in electrode capacitance over that of FIG. 1a.

The advantage achieved with the structure of the invention is that since the separation between the two waveguide arms, or gap g, can be made much smaller than a conventional Mach-Zehnder interferometer of FIG. 1a, an efficient, single-gap, push-pull electrode structure may be used without sacrificing the modulation depth.

For the two-section device depicted in FIG. 3a, the interacting length L is approximately equal to $\sqrt{2}\, l_c$, where $l_c$ is the coupling length for light in one waveguide to switch over entirely to the adjacent path. Preferably, the switching difference is at least $-10$ dB (within about 10% of the desired value) and more preferably is about $-30$ db (within about 0.1% of the desired value). In the optimum case, $L = \sqrt{2}\, l_c$. For multiple-section electrodes, the interacting length will be somewhat longer, and is easily experimentally determined.

Figure 3C:
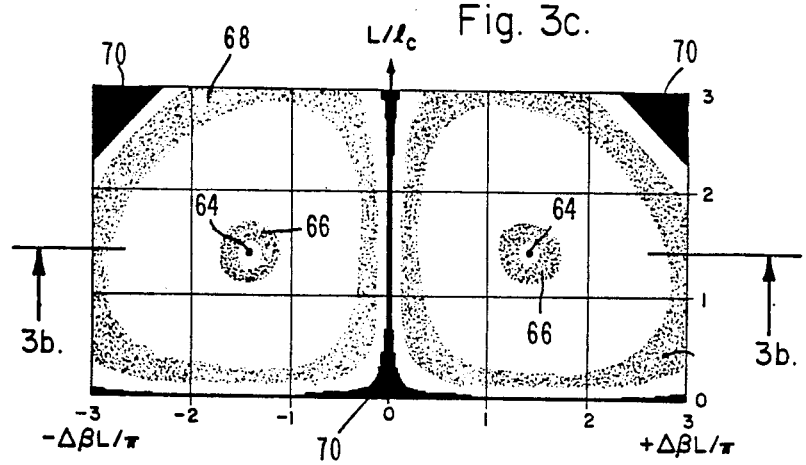
FIG. 3c is a modulation depth plot as a function of normalized voltage for the device of FIG. 3a, showing the contour of differing levels of moodulation depth.

FIG. 3c is a modulation diagram showing the contour of the modulation depth as functions of normalized voltage ($\Delta\beta L/\pi$) and normalized length (L/l). In region 64, the intensity $I_o$ is less than 0.1% ($-30$ dB); in region 66, between 1 and 10% ($-20$ dB to $-10$ dB); in region 68, between 90 and 99%; and in region 70, greater than 99.9%.

The particular branching angle, branching waveguide length and length of interferometric arms 56a, 56b depend on several factors, such as the substrate material, the waveguide material, the specific application, etc. Such values, however, are easily determined in light of the teachings of the invention.

The gap g between electrodes associated with different waveguide branches (e.g., 62a-62c) is about 5 $\mu$m, since the narrower the gap, the stronger the electric field and hence the stronger the electro-optic interaction inside the waveguides. The gap between adjacent electrodes along the same interferometric (e.g., 62a-62b) arm is kept as small as possible, consistent with avoiding electromigration of the metal electrodes. Typically, the latter gap is about twice the gap g between electrodes.

INDUSTRIAL APPLICABILITY

The $\Delta\beta$-phase reversal coupled waveguide interferometer of the invention is useful as a high efficiency, large bandwidth optical modulator.

EXAMPLES

1. Prior Art Mach-Zehnder Interferometer.

To illustrate the effect of coupling between two interferometric arms 16a, 16b on the modulation characteristics of the device 10, several small-gap Mach-Zehnder interferometers were fabricated on Z-cut LiNbO$_3$. The waveguides were fabricated by diffusing about 475 Å thick titanum film into the substrate at 1020° C. for 6 hrs. in a wet argon atmosphere, followed by an hour in a wet oxygen atmosphere. The waveguides forming the Mach-Zehnder interferometer 10 were all 6 $\mu$m wide (W) and supported one single TM mode at a wavelength of 1.3 $\mu$m. A single-section, single-gap electrode, such as illustrated in FIG. 2a, was used. The separation between the two interferometer arms, as well as the electrode gap, was 5 $\mu$m. This corresponds to an interaction length $L \approx \sqrt{2}\, l_c$.

Figure 4A:
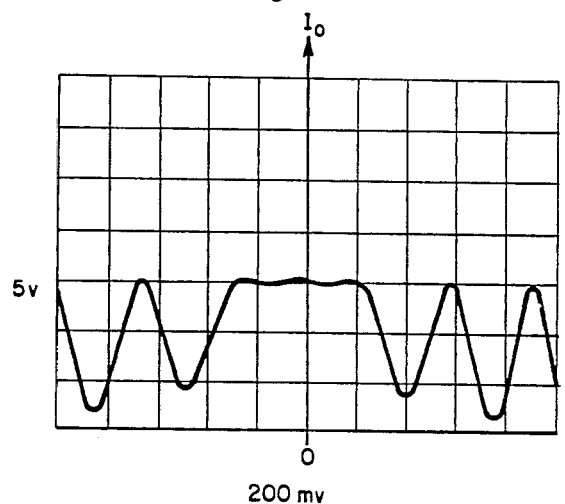
FIG. 4a is a plot similar to that of FIG. 2c, except that it represents actual experimental results.

The measured output intensity as a function of applied voltage is shown in FIG. 4a. There, it is seen that the device did not exhibit an ordinary interferometer characteristic with a sinusoidal-type response at small applied voltages. The modulation depth was in fact extremely poor. Because of the coupling between the two waveguides, as depicted in FIG. 2b, applying an electric field not only electro-optically introduced a simmple relative phase shift, but also affected the optical power transfer characteristics between the two coupled waveguides. The measured plot of FIG. 4a is seen to be identical to the calculated plot of FIG. 2c.

2. $\Delta\beta$-Reversal Coupled Interferometer of the Invention.

In order to improve the modulation depth, the phase reversal coupled interferometer 50 of the invention, depicted in FIG. 3a, was developed, using multiple sections of alternating voltage polarities. The waveguide interferometer sample is the same one that was use in Example 1. The electrode structure, however, consisted of two equal-length sections to which voltages of equal but opposite polarities were applied. The interacting length L was $\sqrt{2}\, l_c$.

Figure 4B:
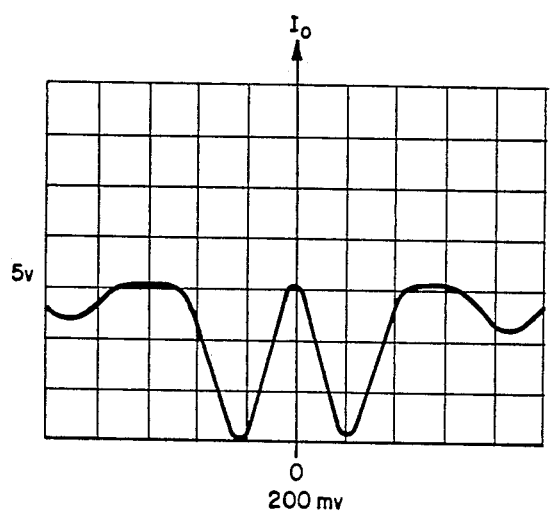
FIG. 4b is a plot similar to that of FIG. 3c, except that it represents actual experimental results.

The measured output intensity as a function of applied voltage is shown in FIG. 4b. The device is seen to exhibit a dramatic improvement in the modulation depth over the device with single-section electrode of Example 1. The measured plot of FIG. 4b is seen to be identical to the calculated plot of FIG. 3b.

Thus, there has been disclosed an improved waveguide interferometer. Various changes and modifications will be readily apparent to those of ordinary skill in the art, and all such changes and modifications are considered to fall within the scope of the invention as defined by the appended claims.

What is claimed is:

1. A coupled waveguide interferometer comprising a single optical input into a Y-branch forming two parallel optical paths, electrodes associated with each said optical path, and a Y-branch combining said optical paths into a single optical output, said electrodes comprising multiple sections of alternating voltage polarity and said parallel optical paths spaced close enough to induce evanescent coupling therebetween.

2. The coupled waveguide interferometer of claim 1 comprising a pair of split electrodes, one pair operatively associated with each parallel optical path, of alternating voltage polarity.

3. The coupled waveguide interferometer of claim 2 wherein each said two parallel optical paths has an interacting length L approximately equal to $\sqrt{2}\, l_c$, where $l_c$ is the coupling length of the interferometer.

4. The coupled waveguide interferometer of claim 3 wherein $L = \sqrt{2}\, l_c$.

5. The coupled waveguide interferometer of claim 1 wherein said two optical paths are separated by less than about 10 $\mu$m.

6. A coupled waveguide interferometer comprising a single optical input into a Y-branch forming two parallel optical paths, electrodes associated with each said optical path, and a Y-branch combining said optical paths into a single optical output, said electrodes comprising a pair of split electrodes, one pair operatively associated with each parallel optical path, of alternating voltage polarity, and said parallel optical paths spaced close enough to induce evanescent coupling therebetween.

7. The coupled waveguide interferometer of claim 6 wherein each said two parallel optical paths has an interacting length L approximately equal to $\sqrt{2}\, l_c$, where $l_c$ is the coupling length of the interferometer.

8. The coupled waveguide interferometer of claim 7 wherein $L = \sqrt{2}\, l_c$.

9. The coupled waveguide interferometer of claim 6 formed on a substrate of $LiNbO_3$.

10. The coupled waveguide interferometer of claim 9 wherein said waveguides comprise titanium diffused in said substrate.

11. The coupled waveguide interferometer of claim 9 wherein said two optical paths are separated by less than about 10 $\mu$m.

12. A method for improving a conventional Mach-Zehnder interferometer, formed on a substrate of electro-optic material, comprising in cooperative combination a single optical input, a Y-junction splitter, two parallel interferometric arms, a Y-junction combiner and a single optical output, with electrodes associated with said interferometric arms, said method comprising forming said interferometric arms with a separation providing evanescent coupling therebetween and forming said electrodes with multiple sections of alternating voltage polarity, thereby providing an interferometer evidencing push-pull operation and having a widely varying output intensity with applied voltage in which said intensity reaches a maximum at an applied normalized voltage of zero and approaches zero at $\pm\sqrt{2}$ where said normalized applied voltage is given by $\Delta\beta L/\pi$, where $\Delta\beta$ is the change in propagation constant due to the electro-optic effect and L is the interacting length of said interferometric arms.

13. The method of claim 12 wherein said said electrodes comprise two sections associated with each interferometric arm, each of alternating voltage polarity.

14. The method of claim 12 wherein said electro-optic material comprises $LiNbO_3$ and said waveguides comprise titanium diffused into the surface of said electro-optic material.

15. The method of claim 14 wherein said separation between said interferometric arms is less than about 10 $\mu$m.

16. A method for forming a coupled waveguide interferometer having a modulation depth that is measured by an output intensity that varies from a maximum at an applied normalized voltage of zero and approaches zero at $\pm\sqrt{2}$, where said normalized applied voltage is given by $\Delta\beta L/\pi$, where $\Delta\beta$ is the change in propagation constant due to the electro-optic effect and L is the interacting length, said method comprising forming on a substrate of electro-optic material (a) a single optical input waveguide, (b) a Y-junction splitter, one side of which is operatively connected to said input, (c) a pair of parallel optical waveguides forming interferometric arms operatively connected to another side of said Y-junction splitter, (d) a Y-junction combiner, one side of which is operatively connected to said pair of interferometric arms, and (e) a single optical output waveguide, operatively connected to another side of said Y-junction combiner, said pair of interferometric arms being separated by a distance sufficient oo induce evanescent coupling therebetween and said method further comprising forming electrodes operatively associated with said interferometric arms, said electrodes comprising multiple sections of alternating voltage polarity.

17. The method of claim 16 wherein said said electrodes comprise two sections associated with each interferometric arm, each of alternating voltage polarity.

18. The method of claim 16 wherein said electro-optic material comprises $LiNbO_3$ and said waveguides comprise titanium diffused into the surface of said electro-optic material.

19. The method of claim 18 wherein said separation between said interferometric arms is less than about 10 $\mu$m.

* * * * *